United States Patent
Degani et al.

(10) Patent No.: US 10,284,502 B2
(45) Date of Patent: May 7, 2019

(54) DYNAMIC OPTIMIZATION FOR IP FORWARDING PERFORMANCE

(71) Applicant: Mellanox Technologies Ltd., Yokneam (IL)

(72) Inventors: Yuval Degani, Tel Aviv (IL); Yohad Tor, Kiryat Motzkin (IL)

(73) Assignee: Mellanox Technologies, Ltd., Yokneam (IL)

( * ) Notice: Subject to any disclaimer, the term of this patent is extended or adjusted under 35 U.S.C. 154(b) by 17 days.

(21) Appl. No.: 15/289,176

(22) Filed: Oct. 9, 2016

(65) Prior Publication Data

US 2017/0104697 A1 Apr. 13, 2017

Related U.S. Application Data

(60) Provisional application No. 62/239,990, filed on Oct. 12, 2015.

(51) Int. Cl.
| | | |
|---|---|---|
| *H04L 12/861* | (2013.01) | |
| *H04L 12/833* | (2013.01) | |
| *H04L 12/935* | (2013.01) | |

(52) U.S. Cl.
CPC ................ *H04L 49/9094* (2013.01)

(58) Field of Classification Search
CPC ...... H04L 49/9094; H04L 49/30; H04L 47/31
See application file for complete search history.

(56) References Cited

U.S. PATENT DOCUMENTS

| | | | | |
|---|---|---|---|---|
| 5,872,783 | A * | 2/1999 | Chin | H04L 49/3009 370/395.32 |
| 6,839,350 | B1 * | 1/2005 | Inouchi | H04L 12/4633 370/335 |
| 6,968,391 | B2 * | 11/2005 | Brennan | H04L 49/351 370/401 |
| 7,536,496 | B2 * | 5/2009 | Harding | G06F 13/14 340/2.1 |
| 8,358,651 | B1 * | 1/2013 | Kadosh | H04L 49/3063 370/360 |
| 9,270,602 | B1 * | 2/2016 | Mimms | H04L 47/21 |
| 9,274,851 | B2 * | 3/2016 | Cheung | G06F 9/5077 |
| 9,319,063 | B2 * | 4/2016 | Wegener | H03M 7/3059 |
| 9,356,866 | B1 * | 5/2016 | Sivaramakrishnan | H04L 45/7453 |
| 2005/0152435 | A1 * | 7/2005 | Lesartre | G06F 13/4282 375/130 |

(Continued)

OTHER PUBLICATIONS

Bradner ., "Benchmarking Methodology for Network Interconnect Devices", Network Working Group, RFC2544, 26 pages, Mar. 1999.

*Primary Examiner* — Rasheed Gidado
(74) *Attorney, Agent, or Firm* — Kligler & Associates (57) ABSTRACT

A host connected to at least one data network has a processor having a plurality of cores, and a memory. A network interface controller is coupled to the host, and configured to transmit and receive data packets via multiple distinct physical ports. The host and the network interface controller are cooperative upon receiving a packet for storing the packet in a receive buffer of the memory, deciding in the host, responsively to a destination identifier in the packet, to forward the packet from the host to the at least one data network via another one of the physical ports, and selecting one of the cores to perform a send operation.

23 Claims, 7 Drawing Sheets

(56) References Cited

U.S. PATENT DOCUMENTS

| | | | |
|---|---|---|---|
| 2008/0244231 A1* | 10/2008 | Kunze | G06F 9/3828 |
| | | | 712/207 |
| 2010/0250930 A1* | 9/2010 | Csaszar | H04L 29/12066 |
| | | | 713/168 |
| 2010/0287227 A1* | 11/2010 | Goel | H04L 67/1002 |
| | | | 709/202 |
| 2011/0219382 A1* | 9/2011 | Hou | G06F 9/50 |
| | | | 718/104 |
| 2011/0314255 A1* | 12/2011 | Krishna | G06F 15/17337 |
| | | | 712/16 |
| 2013/0097345 A1* | 4/2013 | Munoz | H04L 49/109 |
| | | | 710/104 |
| 2013/0103871 A1 | 4/2013 | Domsch et al. | |
| 2014/0101670 A1* | 4/2014 | Bae | G06F 9/46 |
| | | | 718/105 |
| 2014/0169170 A1 | 6/2014 | Almog et al. | |
| 2014/0241353 A1* | 8/2014 | Zhang | H04L 45/74 |
| | | | 370/390 |
| 2015/0222547 A1 | 8/2015 | Hayut et al. | |
| 2015/0263994 A1 | 9/2015 | Haramaty et al. | |
| 2015/0271244 A1 | 9/2015 | Bloch et al. | |
| 2015/0286594 A1 | 10/2015 | Degani | |
| 2016/0248671 A1 | 8/2016 | Arad et al. | |
| 2017/0083334 A1* | 3/2017 | Burger | G06F 9/3004 |

\* cited by examiner

DYNAMIC OPTIMIZATION FOR IP FORWARDING PERFORMANCE

CROSS-REFERENCE TO RELATED APPLICATIONS

This Application claims the benefit of U.S. Provisional Application No. 62/239,990, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over a communications network. More particularly, this invention relates to routing in packet switching systems.

2. Description of the Related Art

The meanings of certain acronyms and abbreviations used herein are given in Table 1.

TABLE 1

| Acronyms and Abbreviations | |
|---|---|
| CPU | Central Processing Unit |
| FIFO | First-in, First-out |
| GUID | Globally Unique Identifier |
| IP | Internet Protocol |
| NIC | Network Interface Card |
| NUMA | Non-Uniform Memory Access |
| OS | Operating System |
| PCI Express | Peripheral Component Interconnect Express |
| QoS | Quality of Service |
| QP | Queue Pair |
| RSS | Receive-Side Scaling |
| TCP | Transmission Control Protocol |
| UDP | User Datagram Protocol |
| WQE | Work Queue Entry |

In most network communication scenarios, the ports of a network interface card (NIC) pass data packets to and from the host to which the NIC is connected. In Internet Protocol (IP) packet forwarding, however, a network node with multiple ports, such as a node with a multi-port NIC or with multiple NICs, may forward at least some of the IP packets that it receives back to the network rather than delivering the traffic to the host. Such traffic is referred to as "IP forwarding traffic". The host, which is typically a processor having multiple CPUs, e.g., a multi-core processor, is responsible, through the operating system and network driver, for managing packet flows, in particular the component of the flows that is represented by IP forwarding traffic.

Contemporary NICs support multiple receive and transmit descriptor queues (multi-queue). On reception, a NIC can send different packets to different queues to distribute processing among the cores. The NIC distributes packets by applying a filter to each packet that assigns it to one of a small number of logical flows. Packets for each flow are steered to a separate receive queue, which in turn can be processed by separate cores. This mechanism is generally known as "Receive-Side Scaling" (RSS). The goal of RSS and the other scaling techniques is to increase performance uniformly.

The filter used in RSS is typically a hash function over the network and/or transport layer headers—for example, a 4-tuple hash over IP addresses and TCP ports of a packet. One hardware implementation of RSS uses a 128-entry indirection table where each entry stores a queue number. The receive queue for a packet is determined by masking out the low order seven bits of the computed hash for the packet (usually a Toeplitz hash), taking this number as a key into the indirection table and reading the corresponding value.

IP forwarding traffic tends to be concentrated in one flow or a small number of flows in which the packets hash to the same CPU cores. Without some load balancing scheme, this tends to overload some of the CPU cores, while others are underutilized. Current methods for spreading the processing load among CPU cores rely mainly on manual configuration (which may be automated by performance-tuning scripts) for binding specific CPUs for certain tasks, e.g., one CPU for incoming traffic and another for outgoing traffic. Such manual ad-hoc solutions may cause loss of compliance with strict requirements to perform both outgoing and incoming traffic processing on the same CPU core or a range of CPU cores for streams that have the same RSS hash values.

SUMMARY OF THE INVENTION

Embodiments of the present invention provide a two-stage solution to the problems described above and provide load balancing among CPU cores:

1. Provide a reliable method for identifying IP forwarding traffic with minimal overhead; and 2. Once incoming IP forwarding traffic has been identified, guarantee that the subsequent outgoing traffic will be processed on a CPU other than the CPU that processed the incoming traffic in order to maximize the system utilization and increase throughput. it may be required that the other CPU be idle. Moreover, the choice of CPU may be restricted to a specific range of cores, e.g., due to system limitations or NUMA proximity.

There is provided according to embodiments of the invention a method, which is carried out by coupling a network interface controller to a host having a plurality of cores. The network interface controller is configured to transmit and receive data packets via multiple distinct physical ports that are connected to at least one data network. The method is further carried out upon receiving a packet from the network by storing the packet in a receive buffer of a memory and deciding in the host, responsively to a destination identifier in the packet, to perform a send operation on the packet and to forward the packet from the host to the at least one data network via another one of the physical ports. One of the cores is selected to perform the send operation.

According to one aspect of the method, deciding in the host includes determining that a memory element of the packet and the receive buffer are co-located on a common page of the memory, and performing a send operation includes referencing the receive buffer containing the memory element to forward the packet while avoiding copying the receive buffer to a send buffer.

A further aspect of the method determining that the memory element of the packet and the receive buffer are co-located on the common page comprises determining that the memory element and the receive buffer are on pages having a common start address.

A further aspect of the method includes inserting a unique signature in the receive buffer, and determining that a memory element of the packet and the receive buffer share the unique signature, and performing a send operation includes referencing the receive buffer containing the memory element to forward the packet while avoiding copying the receive buffer to a send buffer.

According to yet another aspect of the method, the packet is a member of a flow of packets, wherein receiving a packet and performing a send operation on the packet are performed by respective instances of a network driver, and deciding in the host includes making a determination that a thread handle of a prior send operation in the flow and a thread handle of a receive operation for the packet are identical. Responsively to the determination the method is further carried out by initiating a request for a new send operation for the packet in a running thread context of the receive operation for the packet, wherein the new send operation and the receive operation have a common thread handle.

According to an additional aspect of the method, selecting one of the cores is performed according to a fixed rotation schedule.

According to another aspect of the method, selecting one of the cores is performed by identifying an idle core.

According to one aspect of the method, selecting one of the cores is performed by making a determination that one of the cores processed a reception of the packet, and responsively to the determination excluding the one core from selection to perform the send operation.

According to yet another aspect of the method, at least a portion of the cores are processing elements in a logical processor.

There is further provided according to embodiments of the invention a host connected to at least one data network, the host including a processor having a plurality of cores and a memory, a network interface controller coupled to the host, and configured to transmit and receive data packets over the at least one data network via multiple distinct physical ports, the host and the network interface controller cooperative upon receiving a packet for storing the packet in a receive buffer of the memory, deciding in the host, responsively to a destination identifier in the packet, to perform a send operation on the packet to forward the packet from the host to the at least one data network via another one of the physical ports, and selecting one of the cores to perform the send operation.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 1:
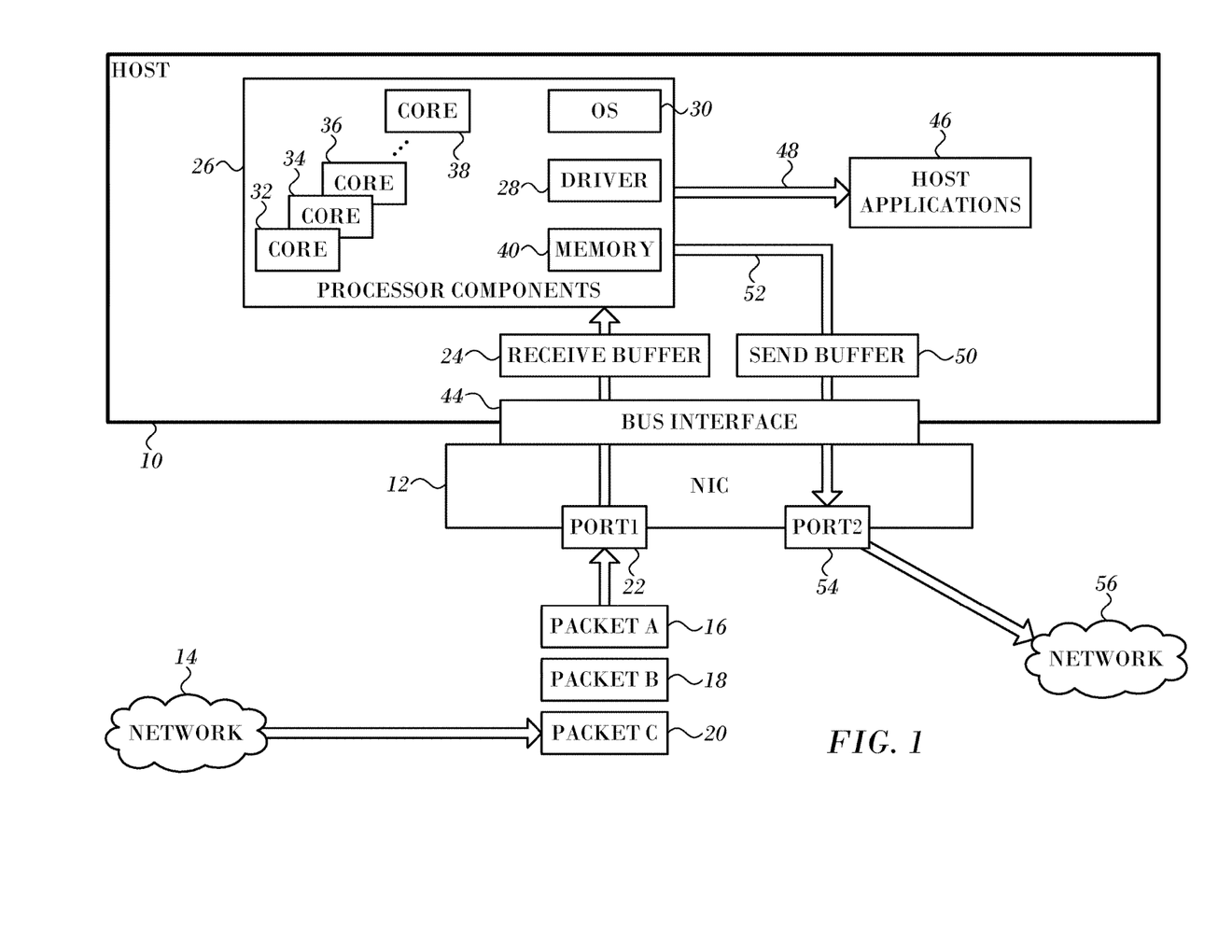
FIG. 1 schematically illustrates a network element, which is connected via a network interface to a data network in accordance with an embodiment of the invention.

Turning now to the drawings, reference is initially made to FIG. 1, which schematically illustrates a network element, host 10, which is connected via network interface 12 to a data network 14 in accordance with an embodiment of the invention. Although portions of the arrangement shown in FIG. 1 are shown as comprising a number of separate functional blocks, these blocks are not necessarily separate physical entities, but rather may represent, for example, different computing tasks or data objects stored in a memory. in practice, however, these blocks are typically (although not necessarily) implemented as hardware and firmware components within a single integrated circuit chip or chipset.

A stream of incoming data packets, here represented by packets 16, 18, 20, arrives from the network 14, entering the network interface 12 via port 22. The packets 16, 18, 20 are communicated from the network interface 12 to a packet queue in a receive buffer 24. While the receive buffer 24 is shown within the host 10, it may be implemented within the network interface 12.

Processor components 26 comprises network driver 28, operating system 30, and a plurality of cores 32, 34, 36, 38. While four cores are shown in the example of FIG. 1, any number of cores greater than one may be present. in addition a suitable memory 40 is provided for processing the packets 16, 18, 20. The principles of the invention are applicable to many multi-processor architectures other than the example of FIG. 1. Thus, the term "CPU" is sometimes used interchangeably with "core" in this disclosure. A core may be a processing element of a logical processor as well as a physical processor. Network interface 12 is connected to the system components 26 via a peripheral component bus 42, such as a PCI Express bus, through a bus interface 44, Elements of the packets 16, 18, 20 are extracted from the receive buffer 24 and distributed into a number of tables in memory 40 that are maintained for purposes of packet steering.

In general one set of the incoming packets 16, 18 20 are destined for use by host applications 46, as indicated by arrow 48. it is the responsibility of the network driver 28 and the operating system 30 to process and forward another set of incoming packets that constitutes IP forwarding traffic.

In some embodiments, when it is determined by logic within the system components 26 that a given packet constitutes iP forwarding traffic an entry is established for the packet in a send buffer 50. The network driver 28 places the payload of the current packet in a work queue entry (WQE). The manner in which this is done is described in further detail below.

The IP forwarding traffic is returned to the network interface 12, as indicated by arrow 52. The IP forwarding traffic then leaves the network interface 12 via port 54 and is returned to network 56, which may be the same as network 14 or may be a different network as shown in FIG. 1.

Figure 2:
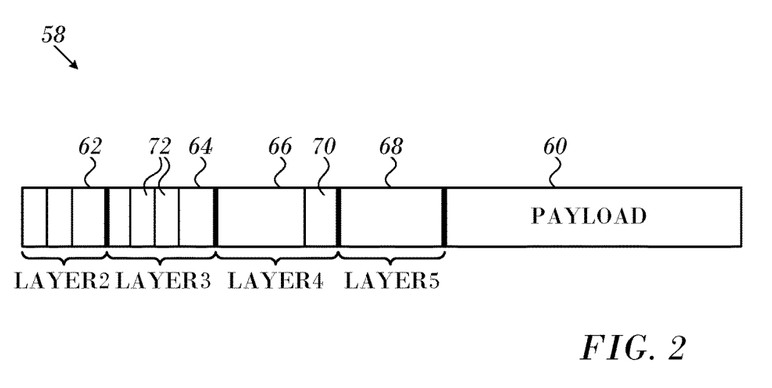
FIG. 2 is a schematic illustration of a general structure of a packet that can be processed in accordance with an embodiment of the invention.

Reference is now made to FIG. 2, which is a schematic illustration of a general structure of a packet 58 that can be processed in accordance with an embodiment of the invention. Packet 58 is provided for illustration purposes. The principles of the invention may be applied to packets having other structures.

Packet 58 generally includes a payload section 60 and a plurality of headers, for example layer-2 header 62, layer-3 header 64, layer-4 header 66 and layer-5 header 68. Each header includes one or more fields. Some of the fields indicate the destination of the packet, such as a field 70 in layer-4 header 66, which occurs, for example, in infiniband packets. Other fields indicate the structure of higher protocol layer headers. For example, fields 72 of layer-3 header 64 may indicate the layer-3 source and destination addresses of the packet 58, as well as an indication of the specific field structure of the layer-4 header 66. Various protocols known in the art govern the field structure that may be used in packet 58.

In order to achieve optimal results in IP forwarding configurations and benchmarks (e.g., RFC2544) in high-speed network fabrics, a first challenge, spreading incoming and outgoing traffic load among multiple CPUs must be overcome. Achieving such results in an environment that is also expected to behave normally in case of non-IP forwarding traffic requires that the host have the ability to distinguish outgoing IP forwarding traffic from other traffic.

Once traffic patterns have been identified and differentiated, a second challenge is spreading the load in such way that will keep the correct order of packets, while maximizing the performance by finding an idle CPU to which to offload outgoing traffic. Default system configurations may cause IP forwarding traffic to be processed on the same CPU for both incoming and outgoing traffic. This is due to the nature of IP forwarding traffic, and of RFC2544 traffic in particular. The latter is characterized by a single stream of traffic or a few streams. As such, the possibilities of spreading the IP forwarding burden among multiple CPUs are not adequately exploited, e.g., using receive-side scaling. Thus, some CPUs are stressed to their limit, leaving other CPUs idle. Furthermore, IP forwarding traffic is most commonly used with raw IP packets, limiting utilization of receive-side scaling even more because the hashing that is used to choose the CPU to handle any given packet is done only on IP addresses, and not on UDP/TCP ports as well. Consequently, there is poor balancing between the receive queues and CPUs in the system.

Referring again to FIG. 1, in a simplified scenario the network driver 28 is configured to support IP forwarding between ports 22, 54 (and vice versa), using any of the CPU cores 32, 34, 36, 38 that are RSS-enabled. Ports 22, 54 are configured for connection to networks 14, 56.

The receive buffer 24 may be a FIFO queue and packets are extracted from the queue according to the order in which they entered the queue. Alternatively or additionally, packets are assigned a quality of service (QoS) score and the order in which the packets are extracted from the receive buffer 24 depends at least partially on their QoS score. The extraction may include an actual copying of the entire packet to a packet pool in the memory 40 and removal from the receive buffer 24, or may be a virtual extraction, which is actually carried out only upon completion of the last stage of handling of each packet.

In any case, upon receiving packet 16 through port 22, the network driver 28 marks core 32 as the receiving core, marks the CPU context of the send packet thread as a candidate for IP forwarding, and uploads it to the operating system 30. The operating system 30 checks the destination of packet 16 and returns it to the network driver 28 to send on port 54. The network driver 28 finds that the current send packet thread is marked in the CPU context as a candidate for IP forwarding and that packet 16 came from port 22. Therefore, rather than executing the send operation on core 32, the driver queues the work for a non-receiving core, e.g., core 34. Core 34 executes the send operation for packet 16 and subsequent packets, while core 32 continues to receive incoming packets.

Identifying IP Forwarding Traffic.

Three solutions are provided for identifying iP forwarding traffic according to embodiments of the invention. They can be used individually or in any combination in order to reduce over-head. Some systems may have certain limitations in using one or more of the solutions, but any system should be able to use at least one of the three embodiments.

For clarity of presentation the process steps are shown in a particular linear sequence in the flowcharts described below. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

Identification of IP Forwarding Traffic.

First Embodiment

In many systems, IP forwarding packets are sent from host, using the same receive buffer that was used for receiving this traffic. This is done in order to save the CPU cycles required to copy the contents to a new buffer. in most systems, receive buffers are allocated by the network driver and have virtual addresses. In this embodiment we exploit this behavior by tracking the receive buffers by their virtual address. It should be noted that buffers allocated by the network driver are always page-aligned in their start addresses, and are at least page-size in length.

Figure 3:
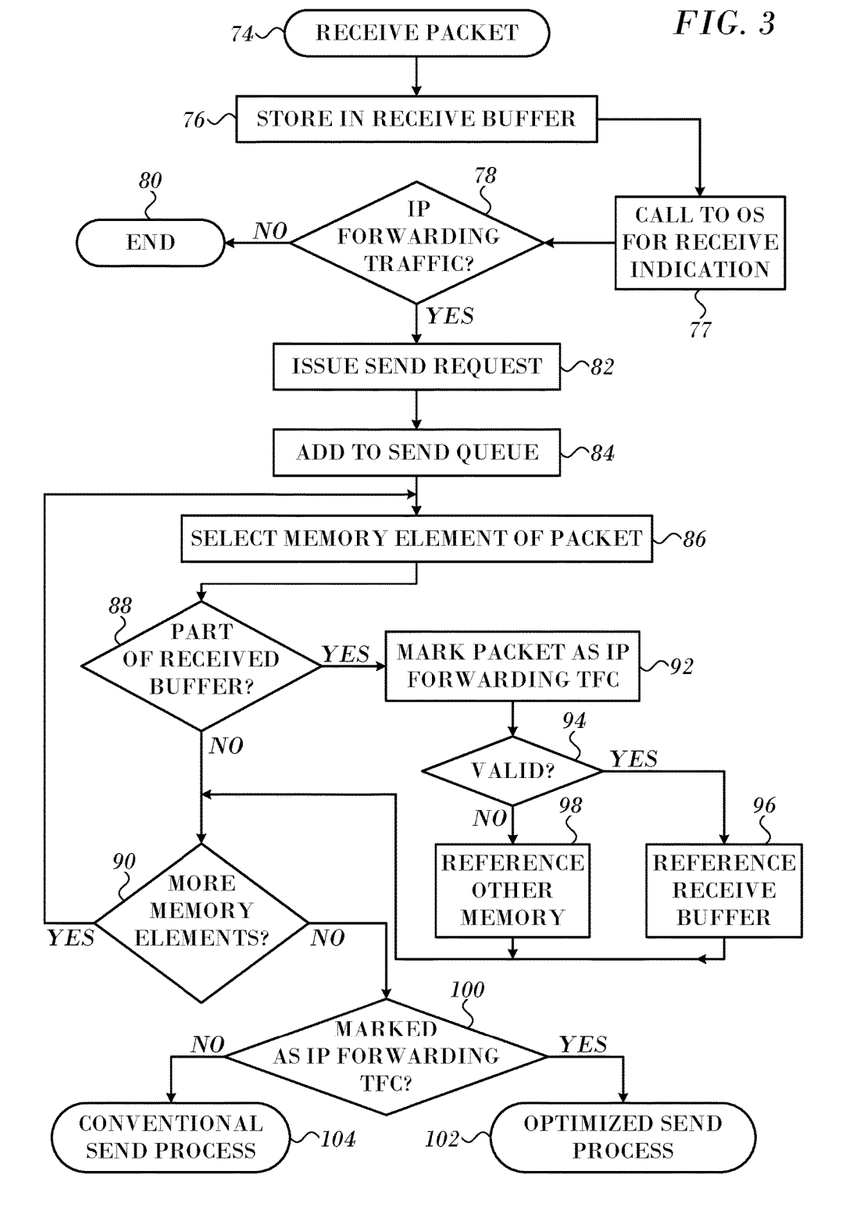
FIG. 3 is a flow chart of a method of processing IP forwarding traffic in accordance with an embodiment of the invention.

Reference is now made to FIG. 3, which is a flow chart of a method of identifying IP forwarding traffic in accordance with an embodiment of the invention. The IP traffic forwarding logic described below can be realized in the network driver alone or with the operating system and hardware-implemented logic in any combination. In this embodiment, self-allocated receive buffers are identified by their addresses. Basically, the routine keeps track of the starting addresses of pages that were allocated by the network drivers for the packets in the receive buffers and matches send buffers to those addresses. It is assumed that network driver 28 (FIG. 1) is in operation, and has preallocated host memory as receive buffer 24 to hold a queue of packets for reception processing.

At initial step 74 a packet is received in a physical port of the network interface 12 (FIG. 1). Then, at step 76 the packet is transferred to the receive buffer 24. Next, at step 77 a call is made to a call is made by the network driver to the operating system, requesting instructions how the current incoming packet is to be handled.

Next, at decision step 78, it is determined if the current packet is IP forwarding traffic, for example by reference to a routing table. In one embodiment, upon receiving the current packet from the network, processing circuitry in the system components 26 check a destination identifier in the packet. This destination identifier may comprise, for example, the destination link-layer or network-layer address (such as a MAC or IP address), which may be a physical or virtualized address. Additionally or alternatively, the destination identifier may comprise transport-layer information, such as a TCP tuple. Based on the destination identifier, the processing circuitry decides whether to make the payload of the current packet available to host applications 46 or to forward the data packet to the network via another one of the physical ports. Typically, the processing circuitry in the system components 26 makes the decision by comparing the destination identifier of the current packet to entries in a forwarding database maintained by the network interface 12 or the host 10. Details of one type of suitable packet steering logic for decision step 78 are taught in commonly assigned U.S. Patent Application Publication No. 2015/0271244, which is herein incorporated by reference.

If the determination at decision step 78 is negative, then the send buffer for the current packet is not relevant and at final step 80 the packet is processed internally by its relevant consumers within the host 10.

If the determination at decision step 78 is affirmative, then, at step 82 a send request is generated by network layers in the operating system 30. Then, in step 82 the current packet is prepared for forwarding. The procedure involved in the preparation is specific to the architecture and operating system in the host 10, the network layers involved and the network communication protocols employed. Typically one or more of the headers of the packet may require revision according to a routing table maintained in the host. The reconfiguration procedure may require storage of revised packet elements in locations in memory 40 that are outside the receive buffer 24. In that event the payload of the packet remains in the receive buffer. Storage for the send request then consists of the revised packet elements in their locations outside the receive buffer, the payload in the receive buffer, and any other data that may remain in the receive buffer.

In step 84 a position in a send queue in send buffer 50 is assigned to the current packet. The send queue can contain a mixture of packets. The mixture may be composed of IP forwarding traffic, i.e., packets that were processed through the receive buffer 24. The send queue may also include packets that were internally generated within the host 10. in both cases the packet data are reconstituted in the send buffer 50 in a coherent fashion for retransmission to the network interface 12 and onward to a forwarding location. However, the details differ for the two types of traffic. In the case of IP forwarding traffic at least a portion of the packet elements can be directly referenced in the send buffer 50 by pointers to the receive buffer 24. Internally generated packet traffic does not involve the receive buffer 24, but is processed in accordance with the standard facilities of the network driver 28 and operating system 30.

The following steps are iterated for each packet in the send buffer 50 and differentiate send requests for IP forwarding traffic from other send requests. It is determined for each packet, element-by-element, if the element is stored in the receive buffer or not. A memory element in the current packet is selected at step 86.

Next, at decision step 88, it is determined if a buffer in the current memory element is part of the receive buffer that was allocated in step 76. This may be accomplished by comparing the start location of the current memory element to the start locations of the pages in the receive buffer.

If the determination at decision step 88 is negative, then, at decision step 90, it is determined if more memory elements in the current packet remain to be evaluated. If the determination at decision step 90 is affirmative then control returns to step 86 to select another memory element.

If the determination at decision step 88 is affirmative, it is concluded that the current packet was processed earlier through the receive buffer 24. The packet is classified in step 92 as IP forwarding traffic. Then, at an optional sequence consisting of decision step 94 and steps 96, 98, it is determined if the identification in decision step 88 was valid for the purpose of fulfilling the send request. For example, the two buffers need to have been allocated from a non-paged pool. Additionally, the two buffers should map to a system-wide virtual address, not merely to a virtual address of the user mode process. In embodiments in which decision step 94 is not performed, control proceeds from step 92 to decision step 90.

If the determination at decision step 94 is affirmative, then at step 96 the location of the current memory element in the receive buffer 24 is referenced in the send buffer 50. The receive buffer 24 is used to transmit the packet.

If the determination at decision step 94 is negative, then at step 98 It may be necessary to copy the current memory element into the send buffer 50. Alternatively, another link to the current memory element may be established in the send buffer 50.

After performing one of steps 96, 98 or if the determination at decision step 88 was negative, then control proceeds to decision step 90, where it is determined if more memory elements in the current packet remain to be evaluated. If the determination at decision step 90 is affirmative then control returns to step 86 to select another memory element.

If the determination at decision step 90 is negative, then at decision step 100 it is determined if the current packet is classified as IP forwarding traffic. This is the case if at least one memory element was marked in step 92. If the determination at decision step 100 is affirmative, then control proceeds to final step 102. An optimized, accelerated send process for sending the current packet is executed, using the receive buffer for handling marked memory elements. Memory elements of the current packet that could not be associated with the receive buffer 24 in iterations of decision step 88 are referenced or copied in the send buffer 50 from other memory as described above with respect to step 98. Further details of final step 102 are described below.

If the determination at decision step 100 is negative, then it may be concluded that the current packet is not IP forwarding traffic, but was internally generated in the host 10. Control proceeds to final step 104 and the send request of the packet is processed conventionally.

The procedure described above may be modified to accommodate packets that exceed the system page size. In such cases the starting addresses of all the allocated pages for the receive buffer and the packet are saved, and all need to be matched as described above.

Second Embodiment

In this embodiment, self-allocated receive buffers are identified by a unique signature. The behavior of the host is exploited as described in the previous embodiment. However, instead of keeping track of pages allocated by the network driver, the IP forwarding identification routine marks the packets with a globally unique identifier (GUID) as a signature that will later enable the routine to identify packets allocated by the driver. The GUID is practically guaranteed not to be duplicated within the operating environment. Regarding the reliability of such a GUID, assuming we reserve a whole cache line for the GUID, which is typically at least 64 bytes in size, we get a GUID that is at least 512 bits in length. The probability of getting a buffer, with a page start having this same randomly-generated GUID, but which was not allocated by the network driver is 1 in 2^512, which renders this method safe. The size chosen for the GUID depends on the level of safety desired. The system is practical, with a high confidence, when 8 bytes are used for the GUID. False positive results do not significantly affect functionality.

Figure 4:
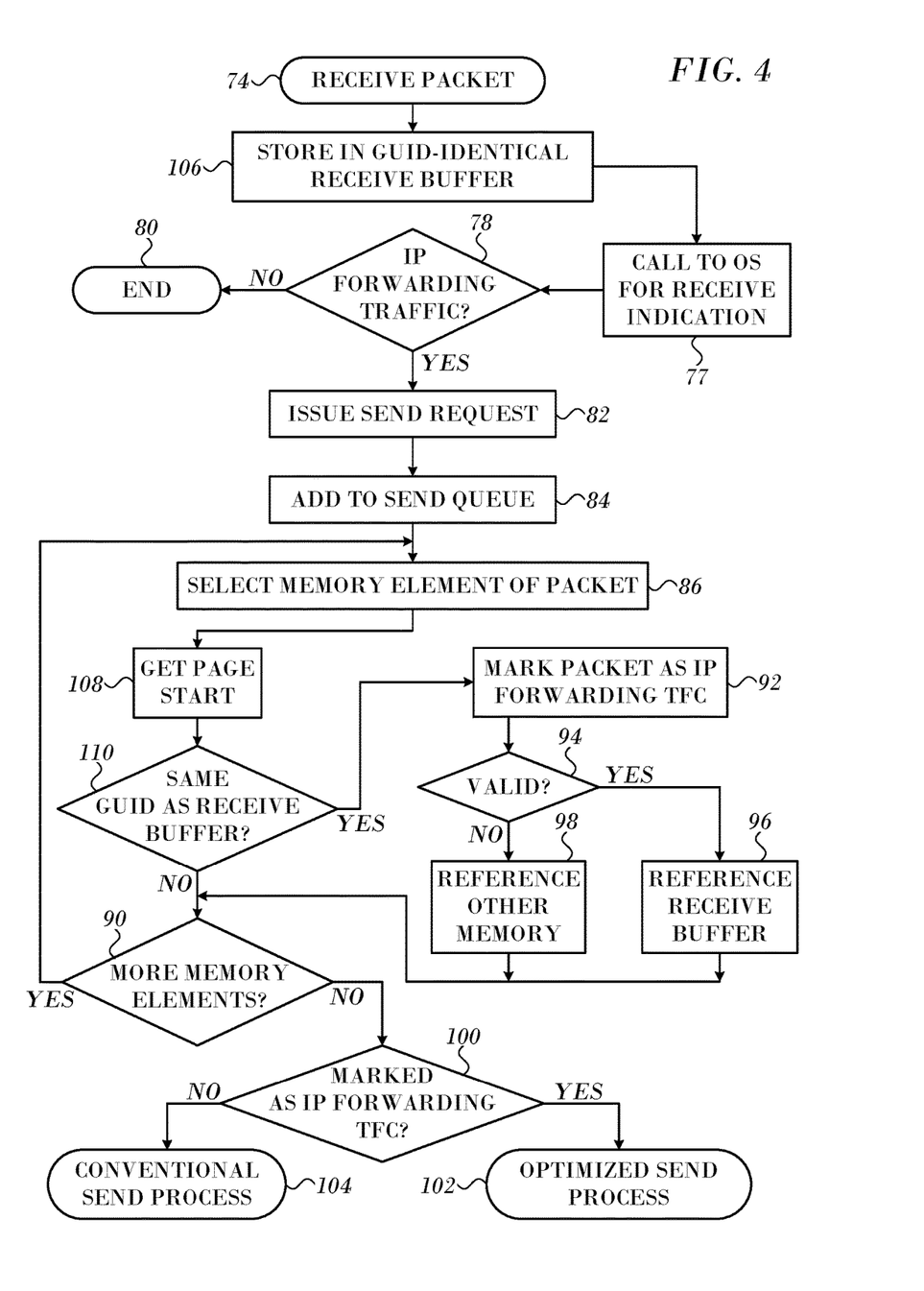
FIG. 4 is a flow chart of a method of processing IP forwarding traffic in accordance with an alternate embodiment of the invention.

Reference is now made to FIG. 4, which is a flow chart of a method of optimizing IP forwarding traffic in accordance with an alternate embodiment of the invention. Steps in common with the previous embodiment are not re-described in the interest of brevity.

After performing initial step 74 the packet is placed in a receive buffer at Step 106. Step 106 is similar to step 76 as described above. However, although the receive buffer is aligned to page size, rather than the packet data beginning at page start, the initial portion of the receive buffer was reserved for the GUID at the time, normally at startup, that the receive buffers were allocated. Respective GUIDs were assigned to the receive buffers at that time as well. Thus, each packet-containing receive buffer in a receive queue has a unique identifier. For example, as noted above, the driver may reserve a whole cache-line for the GUID in order to improve performance for signature reading or packet processing or both. The GUID may be pre-generated. it may be random, or may be generated according to any suitable algorithm.

Step 77, decision step 78, step 82 and step 84 are performed as described above. Then, in the following steps, each memory element of the current packet is examined to determine if the data at page start matches the GUID of the reserved area in the receive buffer.

A memory element in the current packet is selected at step 86. Then at step 108 the starting address of the page holding the current packet is determined. The GUID of the page is then immediately available. We assume that each page is allocated fully, and that allocating parts of pages is not possible in the host system. This is a basic limitation of modern operating systems.

Next, at decision step 110, it is determined if the page holding the current memory element has the same GUID as the page holding the receive buffer that was allocated in step 112. If the determination at decision step 110 is affirmative, then control proceeds to step 92, which was described in the previous embodiment.

Depending on the determination at decision step 110 the sequences beginning with step 92 or decision step 90 are performed, as described in the previous embodiment.

Third Embodiment

Figure 5:
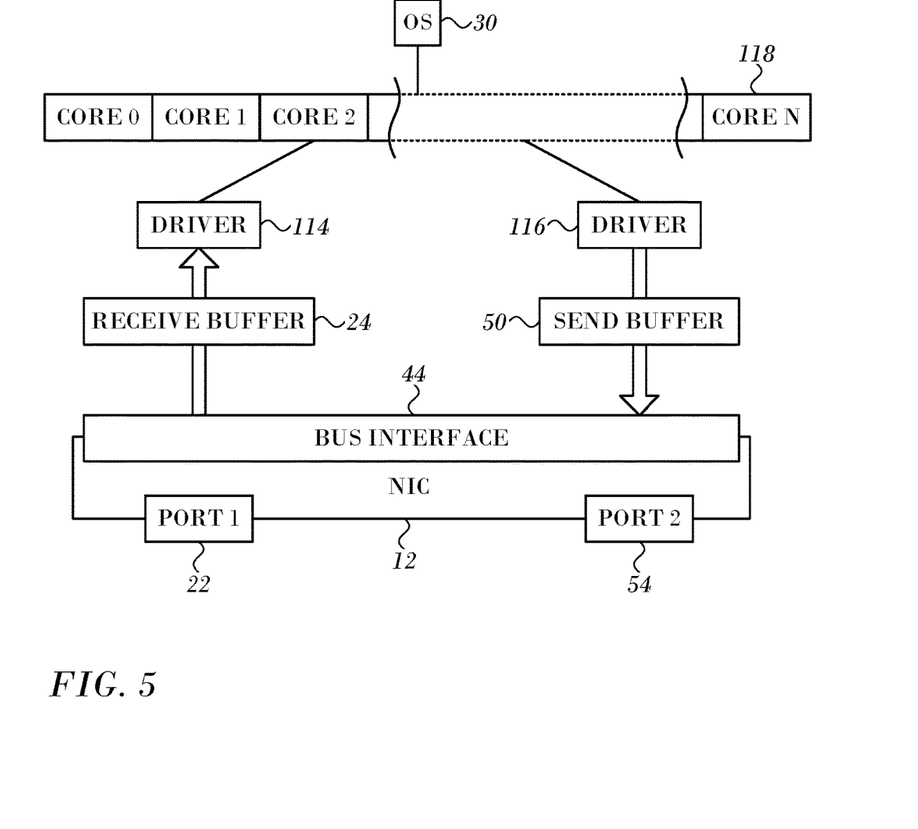
FIG. 5 is a block diagram of an arrangement for processing packet traffic in accordance with an embodiment of the invention.

In this embodiment IP forwarding traffic is identified by send requests within the context of receive operations by reference to the thread handle. Reference is now made to FIG. 5, which is a block diagram of an arrangement for processing packet traffic in accordance with an embodiment of the invention. The two physical ports 22, 54 shown in FIG. 1 are present in FIG. 5, it being understood that any number of physical ports may be found in the network interface 12.

In this embodiment, each of the ports 22, 54 is controlled by a respective one of network driver instances 114, 116. It is assumed that the network driver instances 114, 116 share a context data structure. Thus, network driver instances for ports 22, 54 (FIG. 1) share a context data structure 118, which maintains context information for each CPU core. Whenever one of the network driver instances 114, 116 indicates incoming IP forwarding packets to the operating system 30 in a running thread, e.g., by issuing an interrupt, the operating system 30 responds by executing a send request for forwarding the packets synchronously, i.e., within the same running thread as that of the original receiver. The following is an exemplary sequence:

1. Receive interrupt.
2. Receive buffer processing in network driver.
2. Network driver indicates the packet's receive buffer to the OS networking stack.
4. Networking stack determines that the packets needs to be forwarded and issues a send request (inline of this calling sequence)
5. Send request handled in the network driver again (within the same calling sequence). In contrast, if this were an asynchronous sequence, then the send request would be provided to the network driver outside of the calling thread and stack. In that case the send request would appear with another thread handle).
6. Network driver classifieds the send request as IP forwarding traffic.
7. Network driver processes the send request accordingly (It may defer the processing to another core and thread, making the process asynchronous from this point on).

This embodiment exploits this behavior by marking flows in the sequence of calls.

Figure 6:
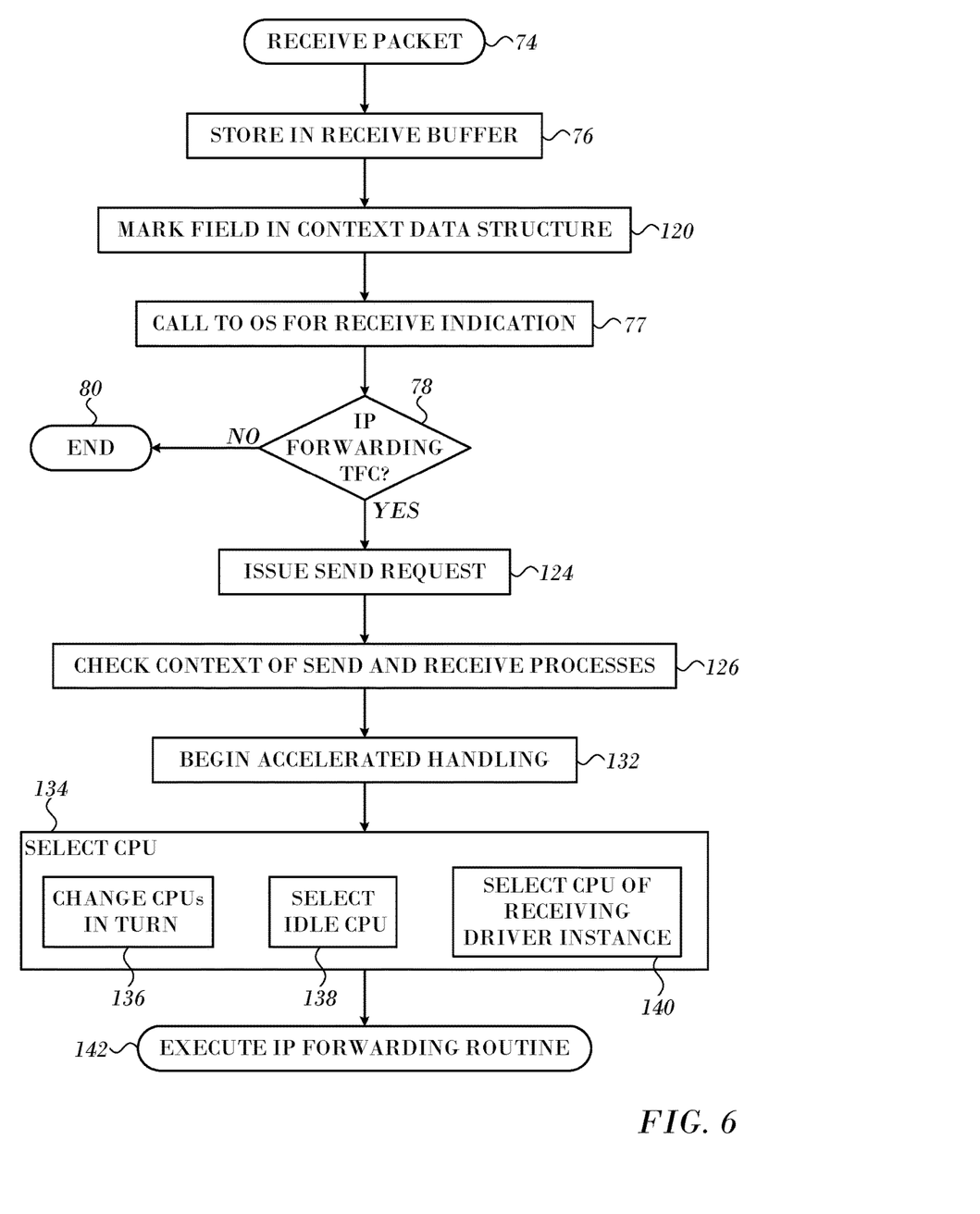
FIG. 6 is a flow chart of a method of processing IP forwarding traffic in accordance with an alternate embodiment of the invention.

Reference is now made to FIG. 6, which is a flow chart of a method of optimizing IP forwarding traffic in accordance with an alternate embodiment of the invention. The following procedure uses the context data structure in a synchronized manner in order to mark a flow in a sequence of calls.

When processing incoming traffic, after performing initial step 74 and step 76 as described above, and before the network driver instance has indicated an incoming IP forwarding packet to the operating system a special field of one of the CPUs in the context data structure 118 (FIG. 5) is marked at step 120. When marked, this field indicates that the reception of the current incoming packet in the host is being processed by a sequence executed on that CPU. The marked field is locked and can be cleared only by the network driver instance that marked it.

Step 77 and decision step 78 are performed as described above. Without waiting for a response to the call at step 77 or the result of decision step 78, a send request is initiated in the same thread context by the network layers of the operating system at step 124.

Then, upon receipt of the receive indication from the operating system, at step 126 the marked field is cleared by the network driver instance. The network driver instance handles the send request and checks that the context of the send request and the receive process for the packet on the same core are identical.

Control proceeds to step 132. The system now begins to process the packet using the optimized accelerated method for IP forwarding traffic described above.

Next, at step 134 a CPU is selected to execute the IP forwarding routine for the current packet. Preferably, in order to achieve optimum load balancing, the selected CPU is idle. However, It may be necessary to avoid changing the order of packets. This means that once a CPU is chosen for offloading a certain stream, it must not change for later offloads. Otherwise, multiple CPUs may post send packets simultaneously, with a resulting undetermined order. Step 134 comprises one of steps 136, 138, 140, which can be chosen according to the characteristics and operating conditions of a particular host. Normally, one of steps 136, 138, 140 is chosen for a session, In step 136 CPUs are chosen in turn, using a constant shift within a range, i.e., according to a fixed rotation schedule. In other words, if $CPU_1$ was the last CPU to execute a packet processing routine, then $CPU_{1+n}$, where n is a constant (with respect to the modulus of the range), always performs the next packet processing routine.

Step 138 comprises tracking idling and non-idling CPUs. One way of determining which CPUs are idle is to track the receive rates of each CPU in a defined range (or even outside the range). When finding an idle CPU, the network driver instance that executed step 132 retains the identifier of the idle CPU as the current destination CPU, and offloads send requests to it until further notice. The destination CPU cannot be changed unless all posted sends are guaranteed to complete. Otherwise, changing the destination CPU could create ordering issues.

In step 140 a sending network driver instance that handles send requests of IP forwarding traffic in a flow exploits the CPU being used by a receiving instance of the network driver, which handles the reception of incoming packets in the flow. When the receiving instance of the network driver provides a receiving indication to the operating system, The core handling the receiving instance is marked, and a send request is communicated by the operating system to the sending network driver instance within the same thread context. The same procedure is followed for all other receiving instances of the network driver. The cores so marked are treated by the sending network driver instance as unavailable for IP forwarding. The sending network driver instance then searches for a core that is not marked, and which is eligible for offloading the send request for execution.

After performing one of the options of step 134, at final step 142 the send request is executed in an IP forwarding routine by the selected CPU.

Figure 7:
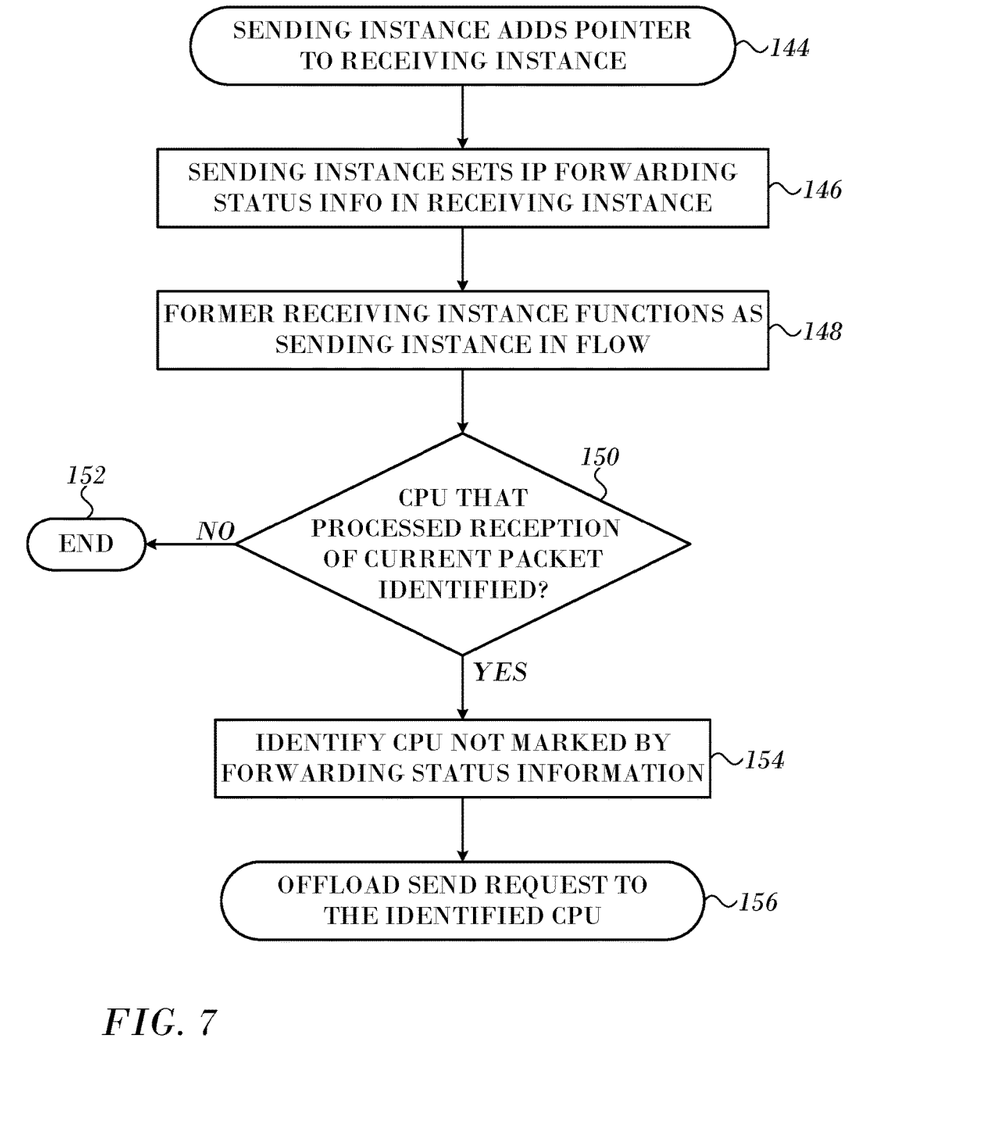
FIG. 7 is a flow chart of a method of selecting a CPU to handle a send request for IP forwarding traffic in accordance with an embodiment of the invention.

Reference is now made to FIG. 7, which is a detailed flow chart of a method of performing step 140 (FIG. 6) to select a CPU to handle a send request in accordance with an embodiment of the invention. At initial step 144 the sending network driver instance adds a field containing a pointer to a data structure in the receiving network driver instance. The pointer is valid only within the current operating system call to produce the receiving indication.

At step 146 the sending network driver instance uses the pointer to set a field in the data structure of the receiving network driver instance. When set, the field informs the receiving network driver instance that it is processing IP forwarding traffic.

In a typical flow involving IP forwarding traffic, the traffic is bidirectional. Thus each receiving network driver instance may sometimes perform the role of a sending network driver instance. The shared information in the data structure established in initial step 144 exists in both the sending and receiving network driver instances. At step 148 a former receiving network driver instance begins to function as a sending network driver instance in the flow.

Next, at decision step 150 it is determined by the former receiving network driver instance whether the send request that it is handling can be associated with a CPU that processed the reception of the current packet as incoming IP forwarding traffic. The determination is made by referencing the shared information in the data structure that was set in step 146.

If the determination at decision step 150 is negative, then control proceeds to final step 152. There is relatively little concern that the CPU handling the current send request will become overloaded by receive requests in the flow.

If the determination at decision step 150 is affirmative then control proceeds to step 154. CPUs that are not marked with the shared information in the data structure that was set in step 146 are identified.

Then, at final step 156 the send request is offloaded to one of the CPUs identified in step 154. Each sending context must retain the destination CPU for send requests until it is guaranteed that any further posting of send operations will not result in incorrect ordering of packets. Moreover, when choosing a CPU in final step 156, consideration must be given to system restrictions. For example, there may be a preference or even a requirement to choose the CPU in the closest NUMA node, or to use CPUs in a particular range. When offloading send operations, the sending network driver instance should guarantee that the completions of the send operations will occur in the same CPU.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
   coupling a network interface controller to a host, the host comprising a processor having a plurality of cores, including a first core and a second core, the network interface controller being configured to transmit and receive data packets over a data network via multiple distinct physical ports that are connected to at least one data network;
   upon receiving a packet belonging to a flow from the network via one of the physical ports assigning a first core to store the packet in a receive buffer of a memory having pages, the pages having virtual start addresses;
   deciding in the host, responsively to a destination identifier in the packet, to perform a send operation on the packet;
   selecting the second core to perform the send operation by excluding the first core from selection;
   with the second core, executing the send operation to forward the packet from the host into the at least one data network via another of the physical ports; and
   using new packets belonging to the flow as the packet, iterating the steps of:

receiving a packet and storing the packet with the first core; and with the second core executing new send operations to forward the new packets exclusively via the other physical port.

2. The method according to claim 1, wherein deciding in the host comprises:

determining that a memory element of the packet and the receive buffer are co-located on a common page of the memory; and wherein performing a send operation comprises referencing the receive buffer containing the memory element while avoiding copying the receive buffer to a send buffer.

3. The method according to claim 2, wherein the step of determining that the memory element of the packet and the receive buffer are co-located on the common page comprises determining that the memory element and the receive buffer are on pages having a common start address.

4. The method according to claim 1, further comprising:
inserting a unique signature in the receive buffer; and
determining that a memory element of the packet and the receive buffer share the unique signature; and
performing a send operation comprises referencing the receive buffer containing the memory element to forward the packet while avoiding copying the receive buffer to a send buffer.

5. The method according to claim 1, wherein receiving a packet and performing a send operation on the packet are performed by respective instances of a network driver, and wherein deciding in the host comprises making a determination that a thread handle of a prior send operation in the flow and a thread handle of a receive operation for the packet are identical.

6. The method according to claim 5, further comprising: responsively to the determination initiating a request for the new send operations for the packet in a running thread context of the receive operation for the packet, wherein the new send operations and the receive operation have a common thread handle.

7. The method according to claim 1, further comprising selecting the second core from the plurality of cores according to a fixed rotation schedule and excluding the first core from the schedule.

8. The method according to claim 1, further comprising selecting the second core by identifying an idle core.

9. The method according to claim 1, wherein at least a portion of the cores are processing elements in a logical processor.

10. The method according to claim 1, wherein selecting the second core comprises selecting only cores allocated for receive side scaling.

11. The method according to claim 1, wherein selecting the second core comprises selecting only cores assigned to receiving packets from queues.

12. An apparatus, comprising:
a host connected to at least one data network, the host comprising a processor having a plurality of cores, including a first core and a second core, and a memory having pages, the pages having virtual start addresses;
a network interface controller coupled to the host, and configured to transmit and receive data packets over the at least one data network via multiple distinct physical ports, the host and the network interface controller cooperative for:

upon receiving a packet belonging to a flow from the at least one data network via one of the physical ports assigning the first core to store the packet in a receive buffer of the memory;

deciding in the host, responsively to a destination identifier in the packet, to perform a send operation on the packet;

selecting the second core to perform the send operation, by excluding the first core from selection;

with the second core, executing the send operation to forward the packet from the host into the at least one data network via another of the physical ports; and using new packets belonging to the flow as the packet, iterating the steps of:

receiving a packet and storing the packet with the first core; and with the second core executing new send operations to forward the new packets exclusively via the other physical port.

13. The apparatus according to claim 12, wherein deciding in the host comprises:

determining that a memory element of the packet and the receive buffer are co-located on a common page of the memory; and wherein performing a send operation comprises referencing the receive buffer containing the memory element while avoiding copying the receive buffer to a send buffer.

14. The apparatus according to claim 13, wherein the step of determining that the memory element of the packet and the receive buffer are co-located on the common page comprises determining that the memory element and the receive buffer are on pages having a common start address.

15. The apparatus according to claim 12, wherein the host and the network interface controller are cooperative for:
inserting a unique signature in the receive buffer; and
determining that a memory element of the packet and the receive buffer share the unique signature; and
performing a send operation comprises referencing the receive buffer containing the memory element to forward the packet while avoiding copying the receive buffer to a send buffer.

16. The apparatus according to claim 12, wherein receiving a packet and performing a send operation on the packet are performed by respective instances of a network driver, and wherein deciding in the host comprises making a determination that a thread handle of a prior send operation in the flow and a thread handle of a receive operation for the packet are identical.

17. The apparatus according to claim 16, wherein the host and the network interface controller are cooperative for: responsively to the determination initiating a request for the new send operations for the packet in a running thread context of the receive operation for the packet, wherein the new send operations and the receive operation have a common thread handle.

18. The apparatus according to claim 12, wherein selecting the second core is performed according to a fixed rotation schedule and by excluding the first core from the schedule.

19. The apparatus according to claim 12, wherein selecting the second core is performed by identifying an idle core.

20. The apparatus according to claim 12, wherein at least a portion of the cores are processing elements in a logical processor.

21. A method, comprising the steps of:
coupling a network interface controller to a host, the host comprising a processor having a plurality of cores, the network interface controller being configured to transmit and receive data packets over a data network via multiple distinct physical ports that are connected to at least one data network;

upon receiving a packet from the network via one of the physical ports storing the packet in a receive buffer of a memory having pages, the pages having virtual start addresses;

inserting a unique signature in the receive buffer; and determining that a memory element of the packet and the receive buffer share the unique signature; and deciding in the host, responsively to a destination identifier in the packet, to perform a send operation on the packet to forward the packet from the host to the at least one data network via another one of the physical ports; and selecting one of the cores to perform the send operation, by referencing the receive buffer containing the memory element to forward the packet while avoiding copying the receive buffer to a send buffer.

22. The method according to claim 21, wherein the packet is a member of a flow of packets, wherein receiving a packet and performing a send operation on the packet are performed by respective instances of a network driver, and wherein deciding in the host comprises making a determination that a thread handle of a prior send operation in the flow and a thread handle of a receive operation for the packet are identical.

23. The method according to claim 22, further comprising: responsively to the determination initiating a request for a new send operation for the packet in a running thread context of the receive operation for the packet, wherein the new send operation and the receive operation have a common thread handle.

* * * * *